United States Patent
Konduru et al.

(10) Patent No.: US 10,613,923 B2
(45) Date of Patent: Apr. 7, 2020

(54) RECOVERING LOG-STRUCTURED FILESYSTEMS FROM PHYSICAL REPLICAS

(71) Applicant: EMC IP Holding Company LLC, Hopkinton, MA (US)

(72) Inventors: Jayasekhar Konduru, Sunnyvale, CA (US); Ashwani Mujoo, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 133 days.

(21) Appl. No.: 15/803,468

(22) Filed: Nov. 3, 2017

(65) Prior Publication Data
US 2019/0138386 A1   May 9, 2019

(51) Int. Cl.
G06F 11/14 (2006.01)
G06F 11/08 (2006.01)
G06F 3/06 (2006.01)

(52) U.S. Cl.
CPC .............. *G06F 11/08* (2013.01); *G06F 3/067* (2013.01); *G06F 3/0608* (2013.01); *G06F 3/0619* (2013.01); *G06F 3/0641* (2013.01); *G06F 3/0643* (2013.01); *G06F 11/1435* (2013.01)

(58) Field of Classification Search
CPC ............. G06F 11/1435; G06F 11/1469; G06F 11/1446; G06F 11/1448
See application file for complete search history.

(56) References Cited

U.S. PATENT DOCUMENTS

| | | | | |
|---|---|---|---|---|
| 7,925,630 | B1* | 4/2011 | Krishnamurthy | G06F 11/1471 707/649 |
| 10,013,313 | B2* | 7/2018 | Zhang | G06F 16/1844 |
| 10,157,003 | B1* | 12/2018 | Faibish | G06F 3/0619 |
| 2007/0198797 | A1* | 8/2007 | Kavuri | G06F 3/061 711/165 |
| 2012/0254565 | A1* | 10/2012 | Mitra | G06F 16/113 711/161 |
| 2014/0074790 | A1* | 3/2014 | Berman | G06F 11/1448 707/649 |
| 2015/0186217 | A1* | 7/2015 | Eslami Sarab | G06F 11/1446 707/649 |

* cited by examiner

Primary Examiner — Yolanda L Wilson
(74) Attorney, Agent, or Firm — Krishnendu Gupta; Peter Jovanovic

(57) ABSTRACT

Systems, methods and apparatuses can present recovery of a log-structured file system. Embodiments can provide sending a request to a cloud store for backup data. The set of backup data received from the cloud store can comprise a set of data and metadata objects. The set of metadata objects can be read in a logical order. Each metadata object can be written from the set of data and metadata objects into block storage of the log-structured file system.

15 Claims, 7 Drawing Sheets

RECOVERING LOG-STRUCTURED FILESYSTEMS FROM PHYSICAL REPLICAS

FIELD

This invention relates generally to data storage and deduplication, and more particularly to recovery of lost or corrupted log-structured filesystems.

BACKGROUND

In a log-structured filesystem, data is written sequentially in a temporal order to a circular buffer called a log. The physical storage for such a filesystem could be coming from one or more block based devices and/or object based storage. Some existing storage systems offer replication at the physical storage level for disaster recovery purposes. However, the physical replication logic in such systems does not have the knowledge of the temporal ordering that a log-structured filesystem needs to operate properly. This could lead to out-of-order writes on the replica, breaking the log-structured semantics with respect to the filesystem data as well as the metadata.

There is a need, therefore, for an improved method, article of manufacture, and apparatus for recovery of lost or corrupted log-structured filesystems.

BRIEF DESCRIPTION OF THE DRAWINGS

The present invention will be readily understood by the following detailed description in conjunction with the accompanying drawings, wherein like reference numerals designate like structural elements, and in which.

BRIEF SUMMARY

Figure 1:
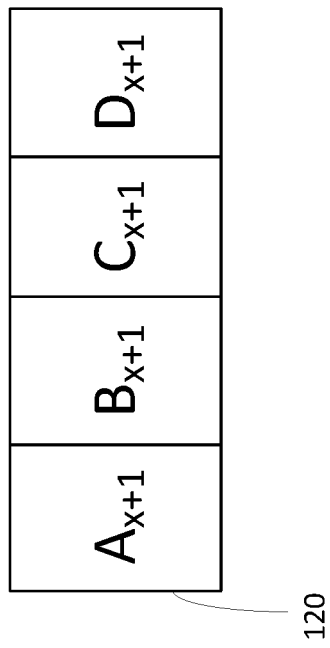
FIG. 1 is a diagram illustrating storage of log structured filesystem metadata or superblock data in accordance with some embodiments of the present disclosure.
Figure 1:
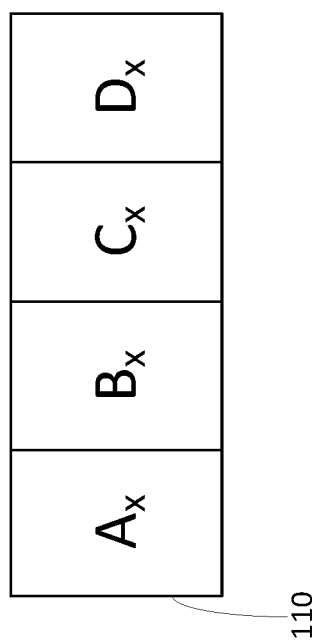

Embodiments can improve data storage processes in a log-structured file system by systems and methods to recover the filesystem data and metadata from physical replica. In such a system the log-structured filesystem can use cloud-based object store as target storage for a physical replica. However, log-structured filesystems can require temporal order, and in the case of a primary site disaster systems and methods to recover the filesystem data and metadata from such physical replica are presented.

Other embodiments are directed to systems, portable consumer devices, and computer readable media associated with methods described herein.

A better understanding of the nature and advantages of embodiments may be gained with reference to this detailed description and the accompanying drawings.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

In certain computer storage systems, the filesystem can uses a cloud-based object store as target storage. In these systems, a log structured filesystem such a Data Domain's log-structured file system (DDFS) is built on the cloud object storage. An embodiment of the invention will be described with reference to a DDFS, but it should be understood that the principles of the invention are not limited to this configuration. The solutions to these problems provided by some embodiments may be applied to multiple different types of log-structured file systems, and certain examples in this application use a DDFS in particular as an example for the purposes of illustration and description. It is not intended to be exhaustive or to limit embodiments to the precise form described, an embodiment can be applied to other systems.

A log-structured filesystem is a file system in which data and metadata are written sequentially to a circular buffer, called a log. When there is new data to write, it is appended to the end of the log. Indexing stored data is accomplished using metadata. The filesystem keeps track of metadata such as the head and tail of the log: log-head and log-tail, respectively.

In a log-structured filesystem, the disk can be divided up into large segments, where each segment can contain a number of data blocks and associated metadata. To keep track of the tail of the log, which is the current segment of the filesystem, a designated portion of metadata, a superblock in the filesystem can contain a reference to the most recently written segment.

Periodically, or when a current segment is full and written to disk, the head segment number in the metadata is updated to reflect the next segment. This can often referred to as a checkpoint. At a checkpoint, once a particular block of metadata has been written, the log-structured filesystem can reflect events that occurred prior to the checkpoint. Periodically the last committed object copy is checkpointed by writing it into the filesystem metadata block. The checkpointed information can be used to tolerate the crashes and resume the recovery from a crash. To clean up the unused segments, the filesystem can periodically also run compaction on the tail of the log, which can determine if blocks in a segment have become stale.

Several cloud storage vendors offer geo-replication products on their object storage which do not guarantee the temporal order in a replica of primary site data. In many cases, it is necessary to have temporal order preserved to properly restore primary site data. For example, in the case of a primary site disaster for a log-based file system, it may be necessary to recover filesystem data and metadata from a physical replica. In such a situation, temporal order preservation of data may be necessary. Similarly, for proximity reasons, users of a data storage system expect a capability to access data from the physical replica. Discussed further are systems and methods to recover log-based filesystem data and metadata from such physical replica.

In addition to the situation where a physical replica is stored in cloud-based storage, the systems and methods discussed can be applicable for local log-based filesystem data and metadata where the metadata is lost or corrupt. The proposed systems and methods can tolerate crashes by resuming a recovery process for a log-structured file system instead of restarting it.

FIG. 1 depicts storage of log structured filesystem metadata according to some embodiments of the current invention. In a log-based filesystem, data is written into a log, and the filesystem level metadata is written into well-known locations (similar to a superblock in many other filesystems). The filesystem metadata could be large and may require more than one atomic write operation. Since the filesystem metadata updates can be in-place and can require more than one atomic write operation, it could lead to corruptions due to crashes. In order to deal with such scenarios, the log structured filesystem can have techniques to write multiple copies of metadata in a ping-pong or similar fashion.

Element 110 of FIG. 1 represents an example of a first copy of filesystem metadata for file system metadata or superblock data at generation X of data. Element 120 of FIG. 1 represent an example of a second copy of filesystem metadata for file system metadata or superblock data at generation X+1 of data. Both may be stored by performing individual atomic writes of data. Such a setup of storing redundant filesystem metadata or superblock data can alleviate problems caused by data corruption due to crashes.

Figure 2:
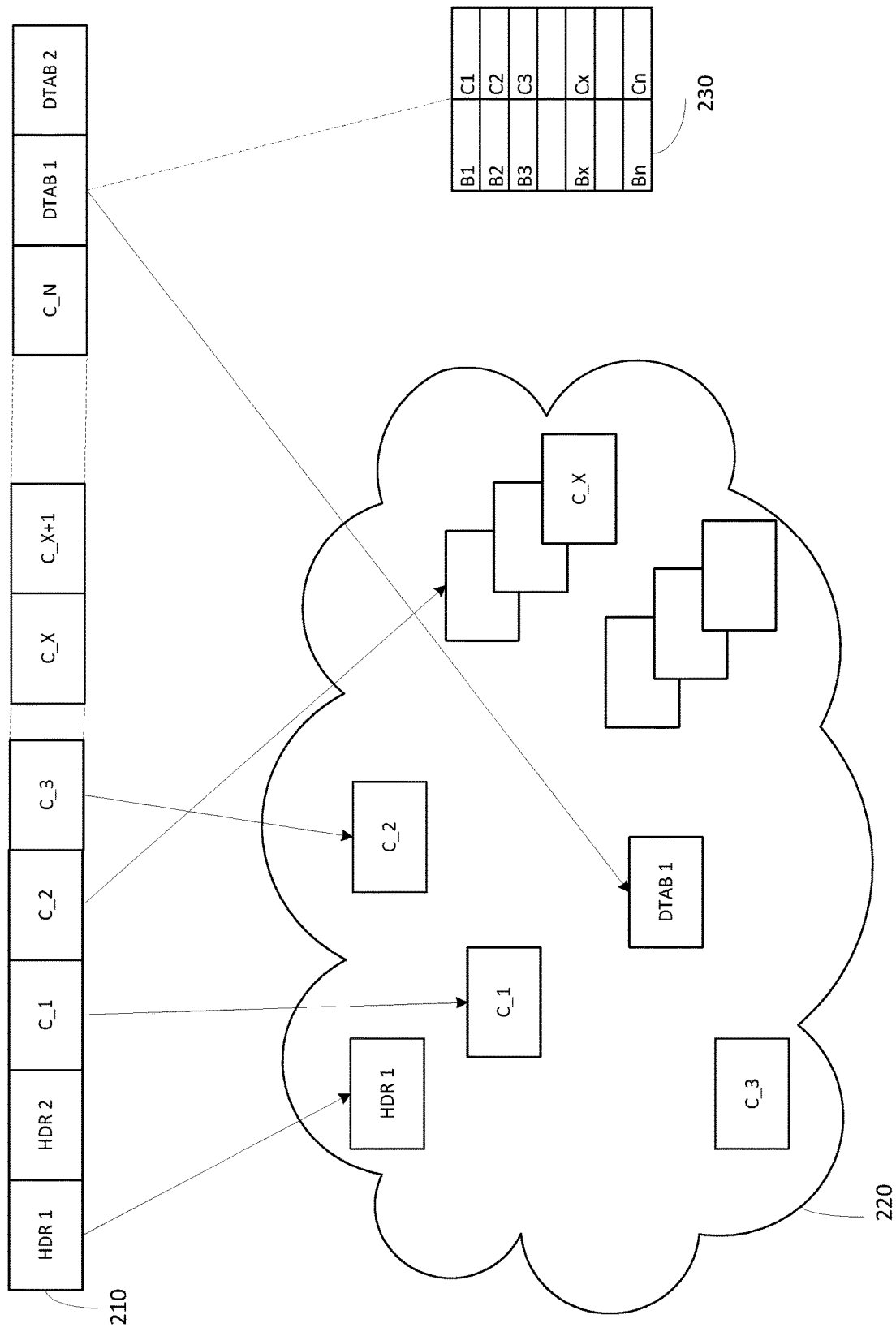
FIG. 2 is a diagram illustrating layouts of metadata log structures and cloud objects in accordance with some embodiments of the present disclosure.

FIG. 2 is a diagram illustrating layouts of metadata log structures and cloud objects in accordance with some embodiments of the present disclosure. FIG. 2 depicts a log-structured filesystem spanning across block and object storage with cloud-based target storage. In DDFS, the log-structured filesystem spans across block and object storage. The block storage can be used to host the latency critical data blocks which can be required to be stored in the local block storage for efficient operation of the filesystem. Such blocks in the log can be mirrored into the object storage into a logically separate address space. The object name itself can carry enough information to identify the object location in the block storage, for example the offset of the file in the block storage.

In FIG. 2, element 210 represents block storage of data in a log-structured filesystem. The data stored in block storage element 210 is mirrored in cloud-based object storage 220. In addition, file system metadata 230 is stored in block storage and mirrored into cloud storage. The data stored in example block storage 210 can include headers HDR 1 and HDR 2, data C_1 through C_N. Additionally stored is metadata DTAB 1 and DTAB 2.

Figure 3:
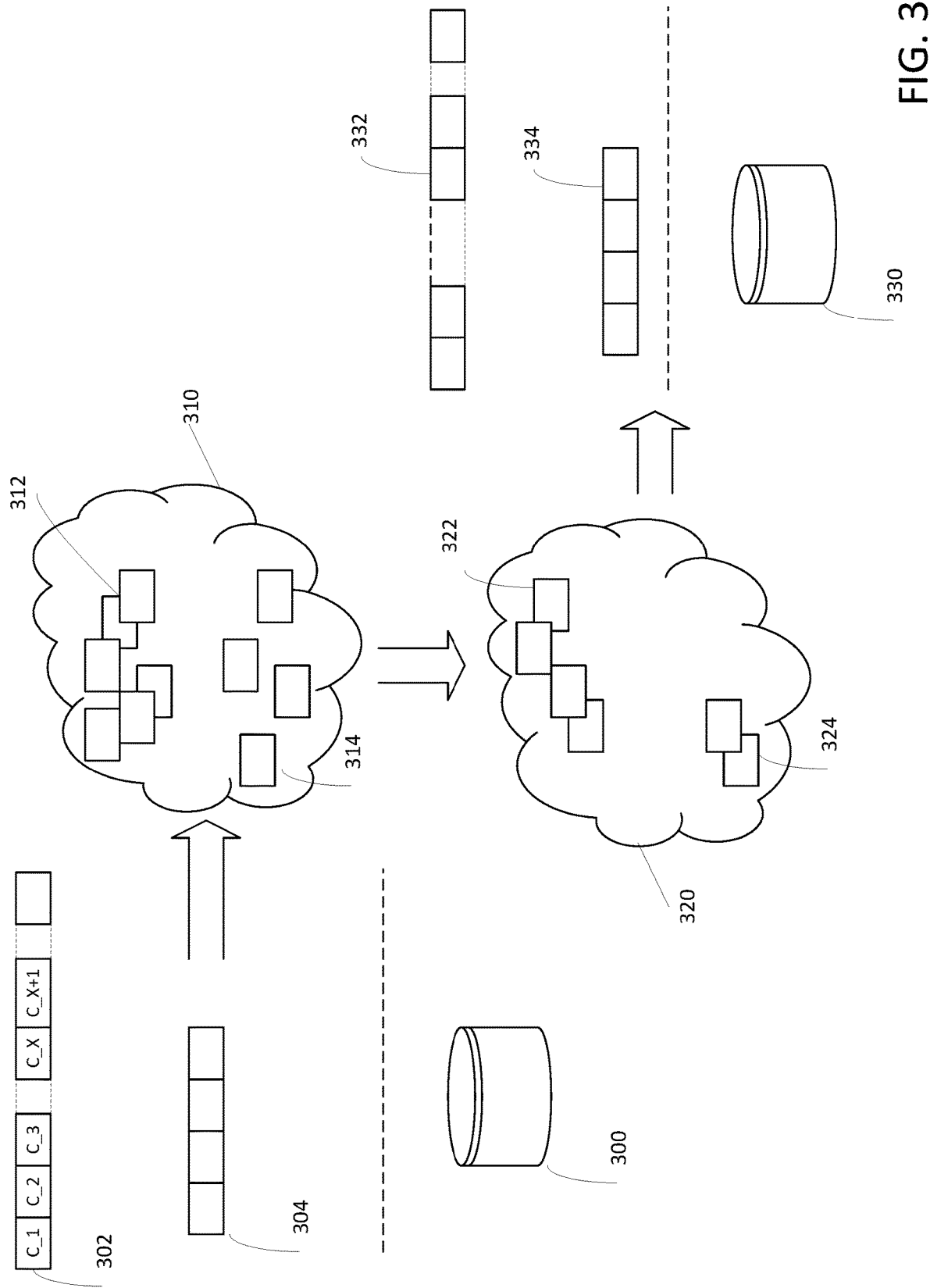
FIG. 3 is a diagram of log-structured file system recovery from a cloud-based replica in accordance with some embodiments of the present disclosure.

FIG. 3 is a diagram of log-structured file system recovery from a cloud-based replica in accordance with some embodiments of the present disclosure.

In case of a disaster, the local compute and the block storage can be lost. For a filesystem to work efficiently and correctly, the performance critical data blocks need to be recovered and restored on the block storage. Often this process involves creating an empty file on the block-storage, reading the objects under the special logical address space in the object store and identifying their location in the log file in the block store and writing them into storage.

For the log-structured filesystem to work normally, it may expect all the blocks between log-tail and log-head to be valid, or such blocks should have been explicitly deleted by the filesystem. This expectation can be because the internal filesystem has reference to all the blocks between log-tail and log-head, except for the blocks that were explicitly deleted. This can pose a challenge when filesystem metadata blocks and/or the data blocks are written out-of-order to the storage. This can occur in the case of physical replication and can lead to inconsistency in the log.

It may not be trivial to identify and solve such issues. Additionally, since the filesystem metadata itself can span multiple blocks, an out-of-order situation for file system metadata can lead to inconsistency in the metadata. For example, a checksum mismatch due to different generations of metadata spread in these blocks is possible.

Additionally, for the local log on the block storage to be created or recreated, the system may need to know the log file size. All such information can be preserved in the filesystem metadata and retrieved for re-creation.

In FIG. 3, local data is stored in an on-premises disk-based volume 300. This local is data and metadata block-based data 302 and metadata 304. This data has been mirrored into the cloud, specifically into cloud-based object store 310. Cloud-based object store 310 contains object data objects 312, which correspond to block-based data 302. Cloud-based object store 310 also contains metadata objects 314, which corresponds to metadata 304.

Cloud-based object store 310 has also been replicated into cloud-based object-store replica 320 in a non-temporal fashion. Cloud-based object store replica 320 contains object data objects 322, which correspond to block-based data 302 and object data objects 312. Cloud-based object store replica 320 also contains metadata objects 324, which corresponds to metadata 304 and metadata objects 314.

In FIG. 3, a disaster has occurred such that on-premises disk-based volume 300 has become non-recoverable. Similarly, cloud-based object store 310 has become non-recoverable due to the disaster. In order to recover, the data from cloud-based object store replica 320 is used. Following the processes described herein, particularly at least in the discussion of FIGS. 4 and 5, data is recovered in: recovered data and metadata block-based data 332, metadata 334 and new on-premises disk-based volume 330.

Figure 4:
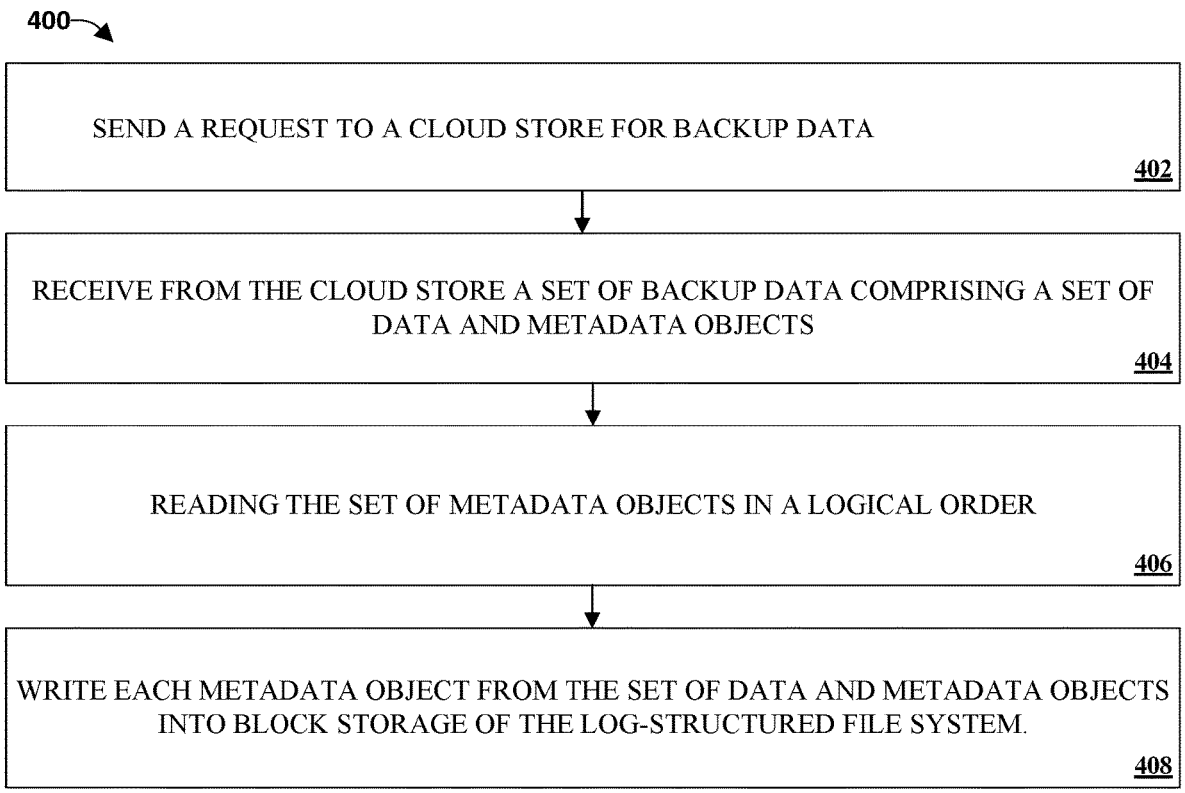
FIG. 4 is a flowchart of a method for method for recovering a log-structured file system in accordance with some embodiments of the present disclosure.

FIG. 4 is a flowchart of a method 400 for recovering a log-structured file system in accordance with some embodiments of the present disclosure. At block 402, a storage system sends a request to a cloud store for backup data that can be used to recover the log-structured file system of the storage system.

At block 404, a set of backup data is received from the cloud store, where the set of backup data comprises a set of data and metadata objects.

The filesystem metadata may need to be rebuilt, if corrupted, missing, or other unavailable. Once received, the set of objects can be listed. In the case of a DDFS, the object-names obtained through listing itself may contain enough information to rebuild the filesystem metadata. In other storage systems, if such info is not sufficient, the regular filesystem rebuild techniques can be applied. Additionally, the objects may be sorted in logical log/block order as necessary. The filesystem metadata such as log-head and log-tail based can be built based on the logical block numbers.

At block 406, the set of the metadata objects can be read in logical order. This reading in logical order can start from the log-tail and the object can be written into block storage at an offset that was stored in the object-name itself. Additionally, all the data blocks that fall in this logical order as they are not required to be cached in the block storage, can be ignored. The log-structured filesystem typically assigns a monotonically increasing logical-id to each block starting from log-tail. When the recovery process visits each such logical object/block, the system can determine if the object qualifies to be stored in block storage. Other objects can be ignored.

In DDFS, the metadata objects can be stored in logically separate address space. Restoring the object in the same offset can be required because it has to satisfy the validation criteria of data invulnerability. Data invulnerability can provide features such as end-to-end verification at backup time, fault avoidance and containment, continuous fault detection and healing, and filesystem recoverability where data is written in a self-describing format where the filesystem can be recreated by scanning the log and rebuilding it from the metadata stored with the data.

At block 408, each metadata object from the set of data and metadata objects is written into block storage of the log-structured file system. Periodically, the last committed object copy can be checkpointed by writing it into a filesystem metadata block. The checkpointed information can be used to tolerate the crashes and resume the recovery. The sanity of each metadata block that was copied can also be verified. For example, in DDFS, this verification can involve, validating the size and checksum of the data, offset and the logical block number. The checksum data can be stored intrinsically as part of an object itself.

Figure 5:
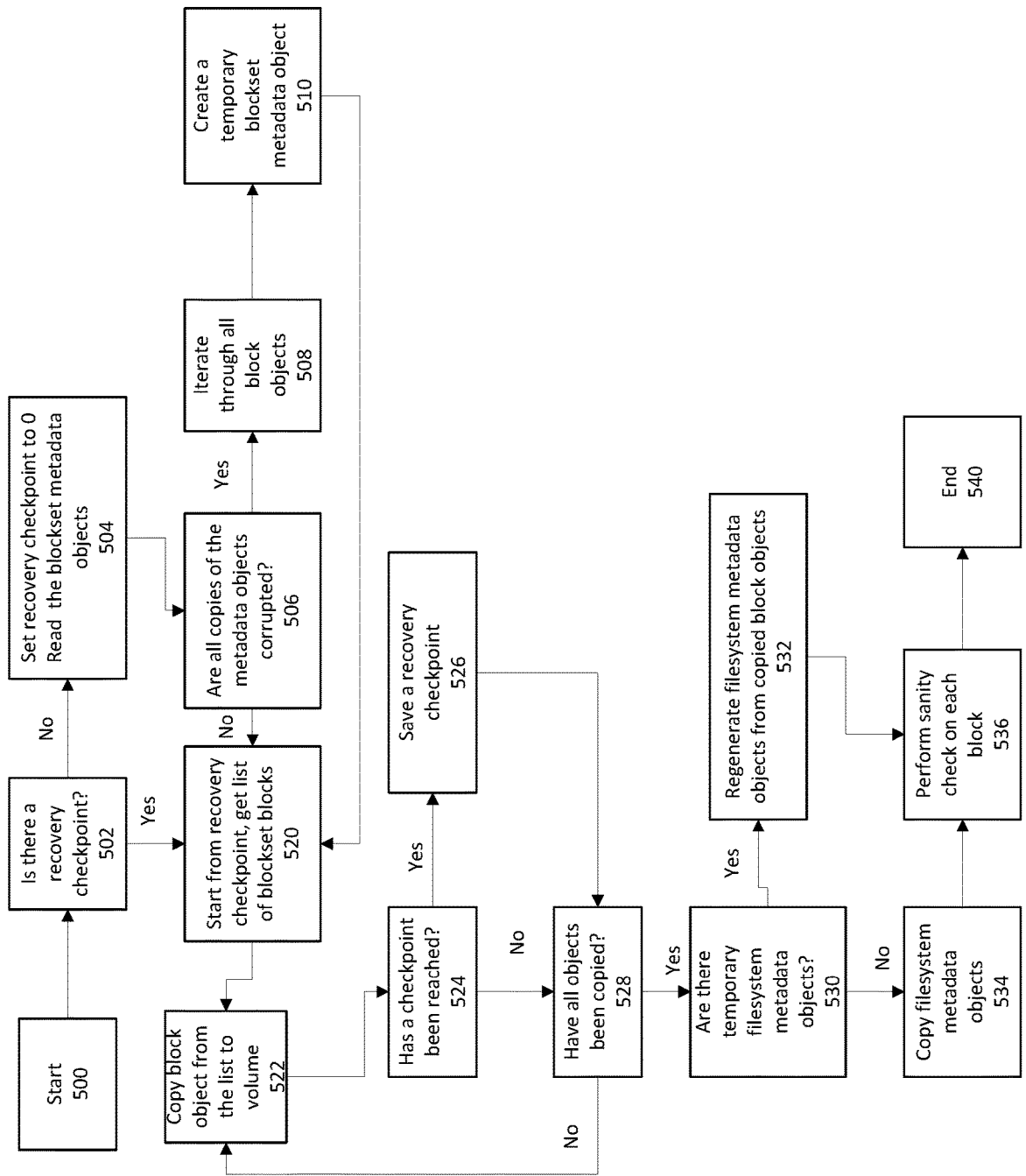
FIG. 5 is a flowchart of a method for recovering a log-structured file system in accordance with some embodiments of the present disclosure.

FIG. 5 is a flowchart of a method 500 for recovering a log-structured file system in accordance with some embodiments of the present disclosure.

At block 502, it is checked if there is a valid recovery checkpoint. If not, then the metadata objects need to be accessed or recreated. At block 504, the set of blockset metadata objects is read and checked at block 506 to see if they are corrupted. There may be more than one set of metadata objects by design in the system, as storing redundant filesystem metadata or superblock data can alleviate problems caused by data corruption due to crashes.

If all copies of the metadata objects are corrupted, then at blocks 508 and 510, the metadata block objects are recreated. At block 508, all block objects are iterated through, and a temporary blockset metadata object is created from the block objects at block 510.

At block 520, once a metadata object is ready to be used, starting from the checkpoint, a list of blockset blocks is obtained. At block 522 block objects are copied from list of blockset blocks one at a time until all objects have been copied. Each time an object is copied, at block 524 it is checked if a checkpoint has been reached, in which case a recovery checkpoint is saved at block 526.

Once all objects have been copied, at block 530, it is checked if there are any temporary filesystem metadata objects. If so, then at block 532, the filesystem metadata is regenerated from copied block objects. If not, then at block 534, the filesystem metadata objects are copied At block 536, sanity checks can be performed on all blocks in storage. The sanity of each metadata block that was copied can be verified. For example, this can include validating the size and checksum of the data, offset and the logical block number. At block 540, the process is complete.

Figure 6:
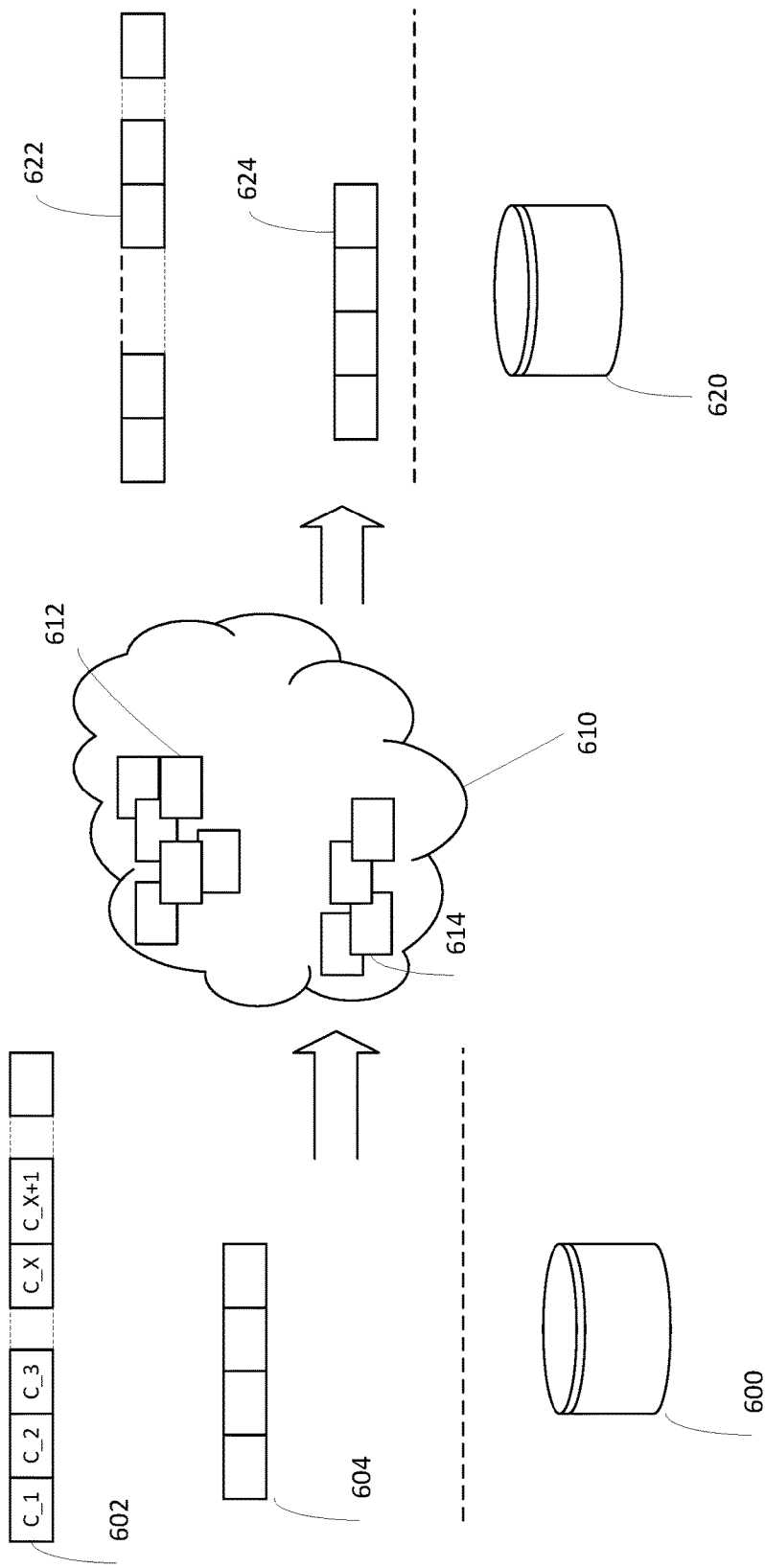
FIG. 6 is a diagram of log-structured file system recovery from a cloud-based replica in accordance with some embodiments of the present disclosure.

FIG. 6 is a diagram of log-structured file system recovery from a cloud-based replica in accordance with some embodiments of the present disclosure. In FIG. 6, in the filesystem metadata is not corrupted.

In FIG. 6, local data is stored in an on-premises disk-based volume 600. This local data is block-based data 602 and metadata 604. This data has been mirrored into the cloud, specifically into cloud-based object store 610. Cloud-based object store 610 contains object data objects 612, which correspond to block-based data 602. Cloud-based object store 610 also contains metadata objects 614, which corresponds to metadata 604.

In FIG. 6, a disaster has occurred such that on-premises disk-based volume 600 has become non-recoverable. In order to recover the data from Cloud-based object store replica 610 is used. Following the processes described herein, particularly at least in FIGS. 4 and 5, data is recovered in: recovered block-based data 622, metadata 624 and new on-premises disk-based volume 620. The same recovery procedure is applicable while recovering from a disaster event that affects the block-storage and the filesystem metadata or superblock in the primary object-store is corrupted as shown. The procedure can be applied similarly, but the metadata does not need to be rebuilt, as the filesystem metadata 614 is not corrupted in cloud object store 610.

Figure 7:
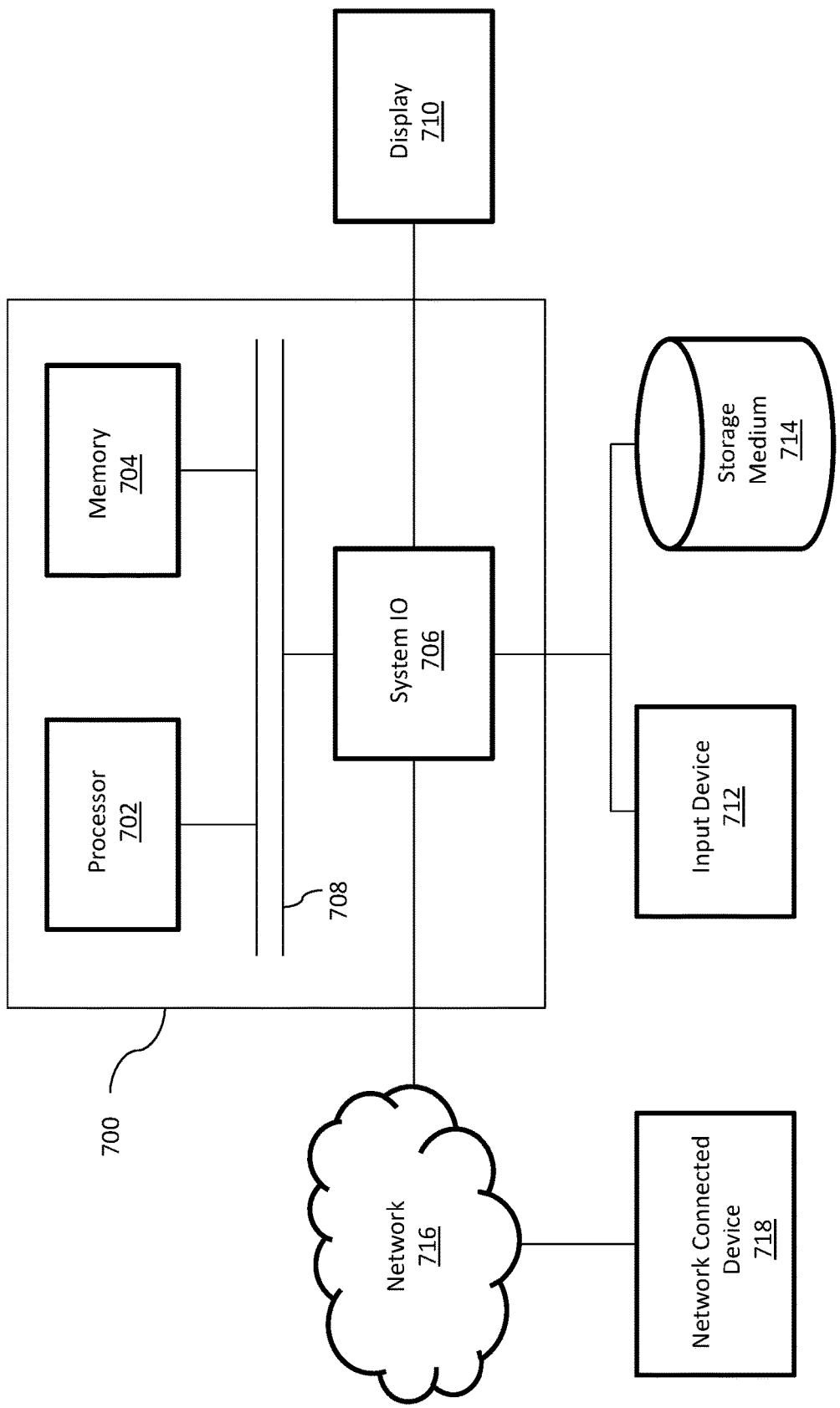
FIG. 7 is a block diagram of an example computer system usable with system and methods according to various embodiments.

FIG. 7 depicts a computer system which may be used to implement different embodiments discussed herein. General purpose computer 700 may include processor 702, memory 704, and system IO controller 706, all of which may be in communication over system bus 708. In an embodiment, processor 702 may be a central processing unit ("CPU") or accelerated processing unit ("APU"). Some embodiments may comprise multiple processors, or a processor with multiple cores. Processor 702 and memory 704 may together execute a computer process, such as the processes described herein.

System IO controller 706 may be in communication with display 710, input device 712, non-transitory computer readable storage medium 714, and/or network 716. Display 710 may be any computer display, such as a monitor, a smart phone screen, or wearable electronics and/or it may be an input device such as a touch screen. Input device 712 may be a keyboard, mouse, track-pad, camera, microphone, or the like, and storage medium 714 may comprise a hard drive, flash drive, solid state drive, magnetic tape, magnetic disk, optical disk, or any other computer readable and/or writable medium.

Network 716 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 716 may be either wired or wireless or any combination thereof, and may provide input to or receive output from IO controller 706. In an embodiment, network 716 may be in communication with one or more network connected devices 718, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A computer-implemented method for recovering a log-structured file system, the method comprising:
    sending a request to a cloud store for backup data, the backup data used to recover the log-structured file system;
    receiving from the cloud store a set of backup data comprising a set of data and metadata objects;
    determining that a valid recovery checkpoint does not exist in the backup data;
    determining that all copies of metadata objects in the log-structured file system are corrupt;
    creating a set of temporary metadata objects;
    reading the set of temporary metadata objects in a logical; and
    writing each metadata object from the set of data and temporary metadata objects into block storage of the log-structured file system.

2. The method of claim 1, further comprising:
    sorting the set of backup data; and
    building the set of metadata objects using the logical block numbers of the data objects.

3. The method of claim 1, further comprising periodically writing checkpoint information into the set of metadata objects.

4. The method of claim 1, further comprising verifying the sanity of each metadata object written into block storage of the log-structured file system.

5. The method of claim 1, wherein each of the metadata objects comprises multiple copies of metadata data.

6. A computer program product for recovering a log-structured file system, comprising a non-transitory computer readable medium having program instructions embodied therein for:
    sending a request to a cloud store for backup data, the backup data used to recover the log-structured file system;
    receiving from the cloud store a set of backup data comprising a set of data and metadata objects;
    determining that a valid recovery checkpoint does not exist in the backup data;
    determining that all copies of metadata objects in the log-structured file system are corrupt;
    creating a set of temporary metadata objects;
    reading the set of temporary metadata objects in a logical order; and
    writing each metadata object from the set of data and temporary metadata objects into block storage of the log-structured file system.

7. The computer program product of claim 6, further comprising:
    sorting the set of backup data; and
    building the set of metadata objects using the logical block numbers of the data objects.

8. The computer program product of claim 6, further comprising periodically writing checkpoint information into the set of metadata objects.

9. The computer program product of claim 6, further comprising verifying the sanity of each metadata object written into block storage of the log-structured file system.

10. The computer program product of claim 6, wherein each of the metadata objects comprises multiple copies of metadata data.

11. A system for recovering a log-structured file system comprising a non-transitory computer readable medium and a processor configured to execute instructions comprising:
    sending a request to a cloud store for backup data, the backup data used to recover the log-structured file system;
    receiving from the cloud store a set of backup data comprising a set of data and metadata objects;
    determining that there a valid recovery checkpoint does not exist in the backup data;
    determining that all copies of metadata objects in the log-structured file system are corrupt;
    creating a set of temporary metadata objects;
    reading the set of temporary metadata objects in a logical order; and
    writing each metadata object from the set of data and temporary metadata objects into block storage of the log-structured file system.

12. The system of claim 11, further comprising:
    sorting the set of backup data; and
    building the set of metadata objects using the logical block numbers of the data objects.

13. The system of claim 11, further comprising periodically writing checkpoint information into the set of metadata objects.

14. The system of claim 11, further comprising verifying the sanity of each metadata object written into block storage of the log-structured file system.

15. The system of claim 11, wherein each of the metadata objects comprises multiple copies of metadata data.

\* \* \* \* \*